US011938518B2

(12) United States Patent
Taylor

(10) Patent No.: US 11,938,518 B2
(45) Date of Patent: Mar. 26, 2024

(54) TECHNIQUES FOR PLANNING OBJECT SORTING

(71) Applicant: AMP Robotics Corporation, Louisville, CO (US)

(72) Inventor: Kevin Taylor, Boulder, CO (US)

(73) Assignee: AMP Robotics Corporation, Louisville, CO (US)

( * ) Notice: Subject to any disclaimer, the term of this patent is extended or adjusted under 35 U.S.C. 154(b) by 0 days.

(21) Appl. No.: 17/153,643

(22) Filed: Jan. 20, 2021

(65) Prior Publication Data

US 2022/0226866 A1 Jul. 21, 2022

(51) Int. Cl.
*B07C 5/36* (2006.01)

(52) U.S. Cl.
CPC ...... *B07C 5/362* (2013.01); *B07C 2501/0063* (2013.01)

(58) Field of Classification Search
CPC .. B07C 5/361; B07C 5/362; B07C 2501/0063
USPC .......................................................... 209/552
See application file for complete search history.

(56) References Cited

U.S. PATENT DOCUMENTS 8,515,579 B2 * 8/2013 Alcazar .................. B25J 9/1669 700/258
8,615,123 B2 12/2013 Dabic
10,207,296 B2 2/2019 Garcia
10,625,304 B2 4/2020 Kumar
10,710,119 B2 7/2020 Kumar
10,722,922 B2 7/2020 Kumar
2017/0080566 A1 * 3/2017 Stubbs ................. G05B 19/418
2017/0232479 A1 8/2017 Pietzka
2018/0243800 A1 * 8/2018 Kumar ................... G06N 20/00
2019/0143375 A1 5/2019 Davison
2019/0233213 A1 8/2019 Phan-Quiroga
2020/0276699 A1 * 9/2020 Buerger ................. B25J 9/1664
2020/0290088 A1 9/2020 Kumar
2020/0368786 A1 11/2020 Kumar
2021/0229133 A1 7/2021 Kumar
2021/0346916 A1 11/2021 Kumar
2022/0016675 A1 1/2022 Kumar
2022/0023918 A1 1/2022 Kumar

* cited by examiner

*Primary Examiner* — Michael McCullough
*Assistant Examiner* — Molly K Devine
(74) *Attorney, Agent, or Firm* — Van Pelt, Yi & James LLP

(57) ABSTRACT

Techniques for planning object sorting are disclosed, including: receiving a set of current information associated with target objects on a conveyor device; determining a current state of the sorting system, wherein the sorting system comprises an actuator device that is configured to actuate a picker assembly to capture target objects from the conveyor device; determining a sequence of actions to be performed by the actuator device and the picker assembly with respect to one or more target objects based on the set of current information associated with the target objects and the current state of the sorting system; determining a selected subset of actions with respect to an identified target object from the sequence of actions; and sending an instruction to the actuator device to cause the actuator device to perform the selected subset of actions with respect to the identified target object.

22 Claims, 11 Drawing Sheets

TECHNIQUES FOR PLANNING OBJECT SORTING

BACKGROUND OF THE INVENTION

Within many industrial facilities, objects are transported on conveyor belts from one location to another. Often, a conveyor belt will carry an unsorted mixture of various objects and materials. Within recycling and waste management facilities, for example, some of the conveyed objects may be considered desirable (e.g., valuable) materials while others may be considered undesirable contaminants. For example, the random and unsorted contents of a collection truck may be unloaded at the facility onto a conveyor belt. Although sorting personnel may be stationed to manually sort materials as it is transported on the belt, the use of sorting personnel is limiting because they can vary in their speed, accuracy, and efficiency and can suffer from fatigue over the period of a shift. Human sorters also require specific working conditions, compensation, and belt speeds. Production time is lost to training the many new employees that enter as sorters, and operation costs increase as injuries and accidents occur.

BRIEF DESCRIPTION OF THE DRAWINGS

Various embodiments of the invention are disclosed in the following detailed description and the accompanying drawings.

DETAILED DESCRIPTION

Figure 1:
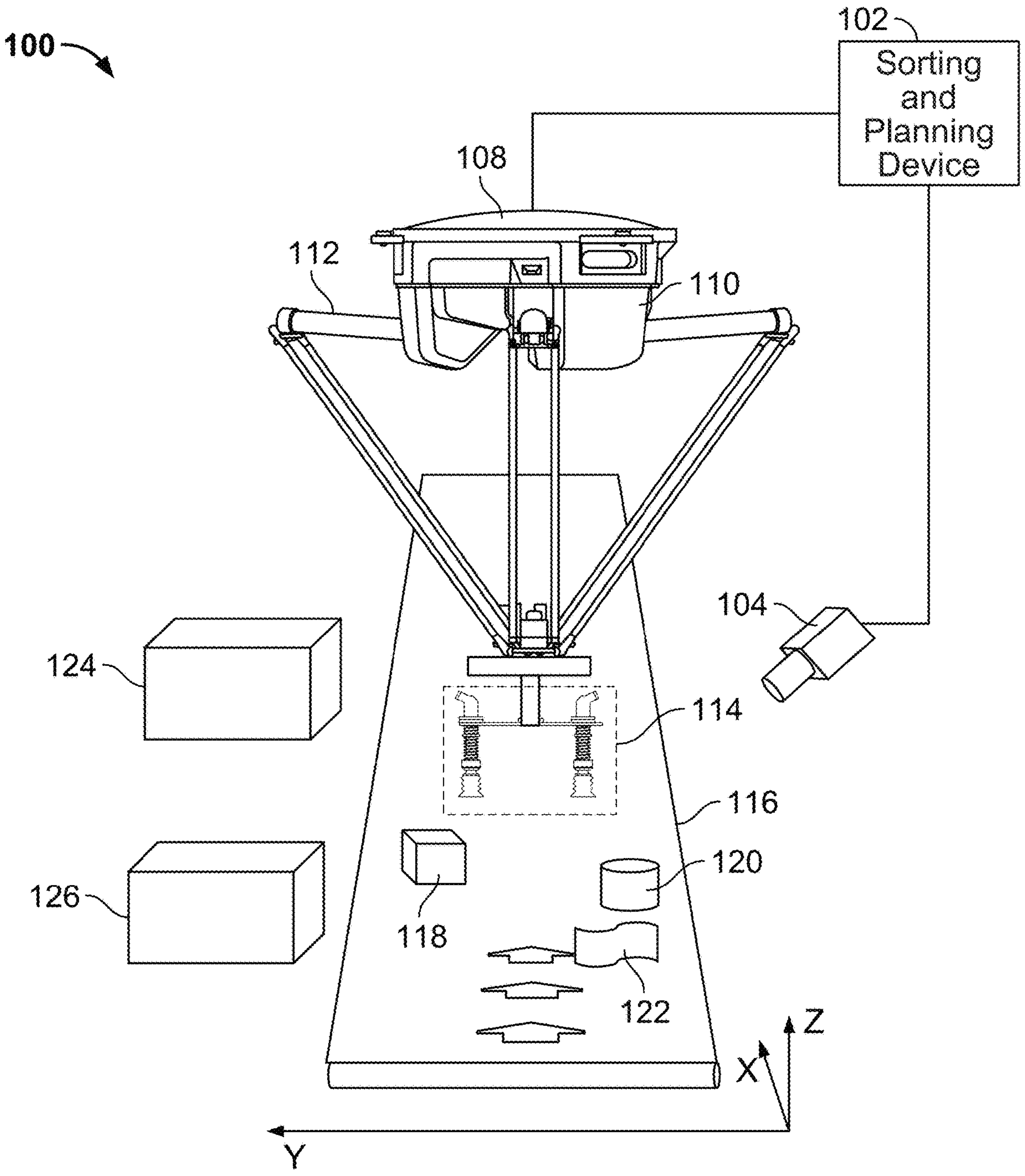
FIG. 1 is a diagram illustrating an example material sorting system in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The introduction of sorting systems (such as robotic systems, for example) for sorting materials has led to increased productivity and decreased contamination for Material Recovery Facilities (MRFs). Robots and similar systems have been utilized as a viable replacement, or supplement, for human sorters due to their speed, reliability, and durability. The objective of sorting systems is to recover the specific target material(s) and eject them into bunkers without introducing other materials (contaminants) into the sorted bunkers. A common technique used by these sorting systems to grasp target materials involves the use of a single dynamically positioned picker mechanism. For example, the picker device may be a suction gripper, a magnetic grasper, and/or a mechanism claw device. In a specific example, suction grippers are mechanisms used to pick up and move objects by applying a concentrated vacuum to a portion of an object's surface with sufficient vacuum strength to capture an object and hold the object to the gripper. For example, a suction gripper can apply a substantial suction force to a target object so as to capture a target object off from a conveyor belt. Once the object is captured, the suction gripper can be repositioned and operated to release the object into a material deposit location.

In some conventional systems, the single picker mechanism is actuated by an actuator mechanism (e.g., a robot) to pick up a single object at a time. Typically, an object that is selected to be picked by the single picker mechanism is determined based on the object's proximity to leaving a pick zone (e.g., an area of the conveyor belt that is reachable by the robot) and a particular attribute of the object. An example of this attribute is the priority assigned to the object. For example, the priority of an object may be determined based on the type of the material from which the object was made or other attributes such as mass. While using the single picker mechanism to select objects based on the object's priority level enables a high pick rate (e.g., a greater number of objects would be picked up and placed into corresponding deposit locations over a given period of time) where the objects are of uniform priority, it has some drawbacks. For example, this strategy ignores any objects that are not the highest priority currently visible. For example, if a robot is picking mid-level priority (priority 1) items but then a higher priority (priority 2) item appears on the belt, the robot will wait for the priority 2 item to enter the pick zone before it will resume picking the priority 1 items. This causes long periods of idleness, during which the robot has the ability to pick priority 1 items but does not. As such, it is desirable to achieve a new object sorting strategy that reduces the idleness of the actuator mechanism and increases the number of objects that are picked up and placed.

Embodiments of planning object sorting are described herein. A set of current information associated with a plurality of target objects on a conveyor device is received. A current state of a sorting system is determined. The sorting system comprises an actuator device that is configured to actuate (e.g., position) a picker assembly to capture target objects from the conveyor device. In some embodiments, the picker assembly includes two or more picker mechanisms. A sequence of actions to be performed by the actuator device and the picker assembly with respect to one or more target objects of the plurality of target objects is determined based at least in part on the set of current information associated with the plurality of target objects and the current state of the sorting system. A selected action is determined with respect to an identified target object from the sequence of actions. An instruction is sent to the actuator device to cause the actuator device to perform the selected action with respect to the identified target object.

As will be described in further detail below, in various embodiments, by determining a sequence of actions that leads to a maximized metric (e.g., a highest combined reward based on the picked up and placed target objects), at least a subset of the sequence of actions can be caused to be performed by the actuator device and the picker assembly to eliminate any idleness that is experienced by the actuator device. Furthermore, in some embodiments, the picker assembly that is actuated by the actuator device comprises two or more picker mechanisms, where each picker mechanism is operable to pick up (and place) a corresponding target object. The planning of the sequence of actions will correspondingly account for the number of picker mechanisms that are included in the picker assembly to therefore take advantage of the two or more target objects that could be picked up by the picker assembly before being placed into a corresponding deposit location.

FIG. 1 is a diagram illustrating an example material sorting system in accordance with some embodiments. In the example of FIG. 1, sorting system 100 includes conveyor device 116 (e.g., a conveyor belt) that is configured to transport objects towards an actuator device that is coupled to picker assembly 114. In the example of FIG. 1, the actuator device is sorting robot 108. Material identified for removal from conveyor device 116 is referred to herein as "target objects." For example, an object may be identified for removal if it is identified to be of a target material type. Although waste products travelling on a conveyor belt are used as example target objects in the example embodiments described herein, it should be understood that in alternate implementations of these embodiments, the target objects need not be waste materials but may comprise any type of material for which it may be desired to sort and/or segregate. Moreover, although a conveyor belt is used as an example conveyance mechanism for transporting the target objects within reach of picker assembly 114, it should be understood that in alternate implementations of these embodiments, other conveyance mechanisms may be employed. For example, for any of the embodiments described below, in place of an active conveyance mechanism such as a conveyor belt, an alternate conveyance mechanism may comprise a chute, slide, or other passive conveyance mechanism through and/or from which material tumbles, falls, or otherwise is gravity fed as it passes by the imaging device.

In some embodiments, sorting robot 108 comprises robotic actuator 110 that controls the position of robotic arms 112 based on instructions received from sorting and planning device 102. Sorting robot 108 is instructed by instructions received from sorting and planning device 102 to control the position (e.g., location, orientation, and/or height) of picker assembly 114 to pick up a target object (e.g., using one of potentially multiple picker mechanisms of picker assembly 114) from conveyor device 116 and/or to control the position of picker assembly 114 to drop/place the one or more picked up target objects in a corresponding deposit location. Receptacles 124 and 126 are two example collection containers that are located at two different deposit locations. In some embodiments, each deposit location is to receive target objects of a corresponding material type. For example, each of receptacle 124 and receptacle 126 is designated to collect target objects of a different material type.

Material sorting system 100 further comprises at least one object recognition device such as object recognition device 104, which is utilized to capture information about objects on conveyor device 116 in order to discern target objects from non-target objects. For example, as described above, a "target object" is an object that is identified to have a target material type. For example, a "non-target object" is an object that is identified to not have a target material type (e.g., a contaminant). Object recognition device 104 may comprise an image capturing device (such as, for example, an infrared camera, visual spectrum camera, or some combination thereof) directed at conveyor device 116. However, it should be understood that an image capturing device for object recognition device 104 is presented as an example implementation. In other embodiments, object recognition device 104 may comprise any other type of sensor that can detect and/or measure characteristics of objects on conveyor device 116. For example, object recognition device 104 may utilize any form of a sensor technology for detecting non-visible electromagnetic radiation (such as a hyperspectral camera, infrared, or ultraviolet), a magnetic sensor, a volumetric sensor, a capacitive sensor; or other sensors commonly used in the field of industrial automation. In some embodiments, object recognition device 104 is directed towards conveyor device 116 in order to capture object information from an overhead view of the materials being transported by conveyor device 116. Object recognition device 104 produces an input signal that is delivered to sorting and planning device 102. The input signal that is delivered to sorting and planning device 102 from object recognition device 104 may comprise, but is not necessarily, a visual image signal.

As will be described in further detail below, object recognition device 104 produces one or more input signals that are delivered to sorting and planning device 102 and which may be used by sorting and planning device 102 to send instructions to sorting robot 108 to cause sorting robot 108 to actuate picker assembly 114 to either use a specified picker mechanism thereof to pick up a target object, or to drop off/place all picked up target objects by one or more picker mechanisms thereof into a (e.g., single) corresponding deposit location. Because conveyor device 116 is continuously moving (e.g., along the X-axis) and transporting objects (e.g., such as objects 118, 120, and 122) towards sorting robot 108, the positions (e.g., along the X-axis) of target objects 118, 120, and 122 are continuously changing. As such, object recognition device 104 is configured to continuously capture object information (e.g., image frames)

that shows the updated positions of the target objects (e.g., such as objects 118, 120, and 122) and send the captured object information to sorting and planning device 102. As will be described in further detail below, sorting and planning device 102 is configured to use a recent set of captured object information from object recognition device 104 to generate a current (e.g., most recent) set of current information associated with the target objects. In various embodiments, sorting and planning device 102 is then configured to use this most recent set of current information associated with the target objects and the current state of sorting system 100 to search for a sequence of actions to be performed by sorting robot 108 and picker assembly 114 that will lead to the greatest reward (as a function of the picked up and placed target objects). Examples of an action are picking up an identified target object with a specified picker mechanism of the picker assembly, placing a picked up target object into a corresponding deposit location, and placing two or more picked up target objects into a single deposit location. Sorting and planning device 102 is then configured to select a subset of actions (e.g., the first action) from the sequence of actions and then send an instruction to sorting robot 108 and/or picker assembly 114 to cause sorting robot 108 and picker assembly 114 to perform the selected subset of actions from the sequence of actions. By continuously generating a sequence of actions that will lead to the greatest reward based on the most updated object information, sorting and planning device 102 can ensure that the selected subset of actions from the sequence that it actually causes sorting robot 108 and picker assembly 114 to perform will actually optimize the value of the picked and placed target objects for each given opportunity that sorting robot 108 and picker assembly 114 has to act, as well as eliminate any idle time that might be experienced by sorting robot 108 and picker assembly 114.

While not shown in FIG. 1, in some embodiments, sorting and planning device 102 is further configured to send control signals to a pneumatic control system that is coupled to picker assembly 114 to activate the vacuum or other mechanism that is employed by each of picker assembly 114's picker mechanisms to pick up target objects. For example, sorting and planning device 102 is further configured to send the control signals to the pneumatic control system close in time to when sorting and planning device 102 is configured to send instructions to sorting robot 108 to perform the selected actions.

Figure 2:
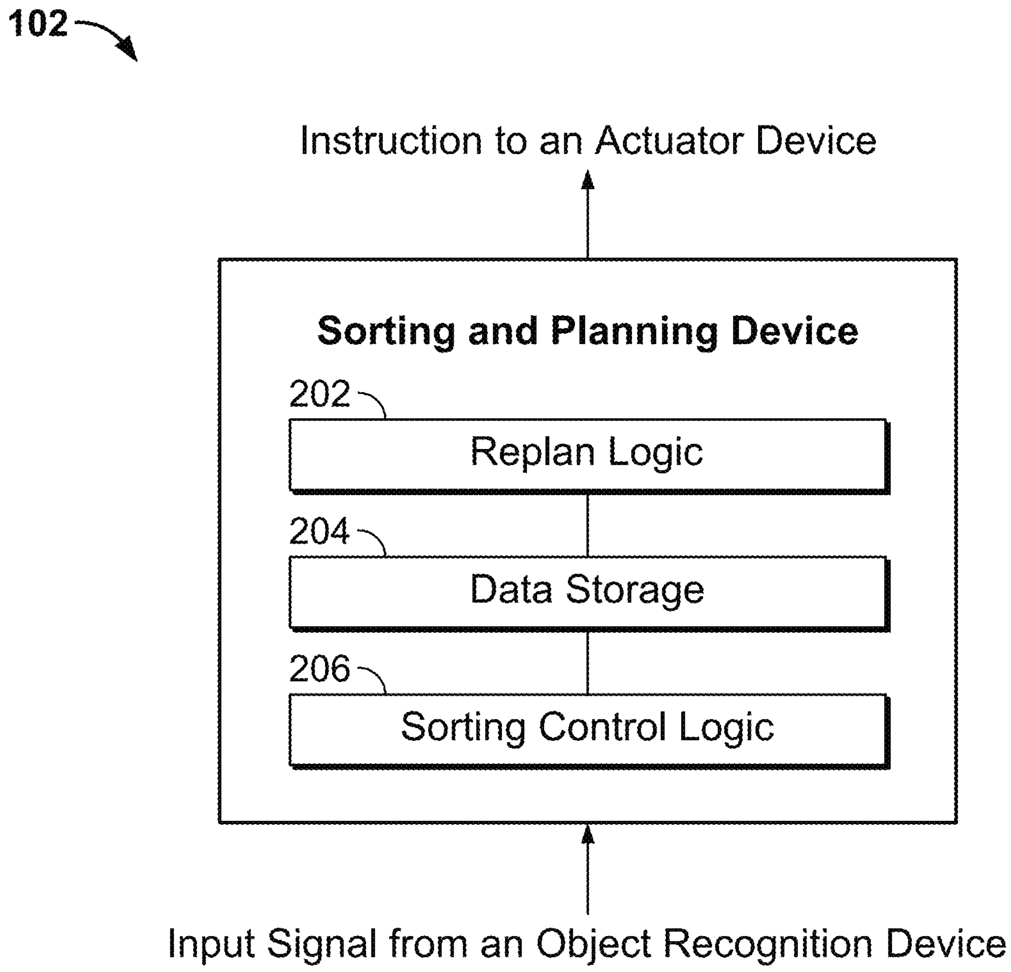
FIG. 2 is a diagram showing an example of a sorting and planning device in accordance with some embodiments.

FIG. 2 is a diagram showing an example of a sorting and planning device in accordance with some embodiments. In some embodiments, sorting and planning device 102 of sorting system 100 of FIG. 1 may be implemented using the example of FIG. 2. In the example of FIG. 2, the sorting and planning device includes replan logic 202, data storage 204, and sorting control logic 206. In some embodiments, replan logic 202, data storage 204, and sorting control logic 206 may either be implemented together on a common physical non-transient memory device, or on separate physical non-transient memory devices. In some embodiments, data storage 204 may comprise a removable storage media. In various embodiments, the sorting and planning device may be implemented using a microprocessor coupled to a memory that is programmed to execute code to carry out the functions of the sorting and planning device described herein. In other embodiments, the sorting and planning device may additionally, or alternately, be implemented using an application specific integrated circuit (ASIC) or field programmable gate array (FPGA) that has been adapted for machine learning and/or cloud computing.

Sorting control logic 206 comprises one or more neural processing units (not shown) and a neural network parameter set (which stores learned parameters utilized by the neural processing units). In various embodiments, sorting control logic 206 is configured to receive input signals (e.g., one or more image frames) from an object recognition device, which is configured to capture object information (e.g., using a sensor such as a camera) of objects that are being transported on a conveyor device. In some embodiments, sorting control logic 206 is configured to provide raw object data (which in the case of a camera sensor may comprise image frames, for example) as input to one or more neural network and artificial intelligence techniques of the neural processing units to locate and identify material appearing within the image frames that is potentially target objects. As the term is used herein, an "image frame" is intended to refer to a collection or collected set of object data captured by an object recognition device that may be used to capture the spatial context of one or more potential target objects on the conveyor mechanism along with characteristics about the object itself. A feed of image frames captured by the object recognition device (e.g., object recognition device 104 of FIG. 1) is fed, for example, to a machine learning inference technique implemented by neural processing units. The sequence of captured image frames may be processed by multiple processing layers, or neurons, of the neural processing units to evaluate the correlation of specific features with features of objects that it has previously learned.

Based on the input raw object data (e.g., image frames) that is provided by an object recognition device, sorting control logic 206 is configured to determine information related to target objects that are being transported by a conveyor mechanism. In some embodiments, the information related to target objects that are determined by sorting control logic 206 includes attribute information. For example, attribute information includes one or more of, but not limited to, the following: a material type associated with each target object, an approximate mass associated with each target object, a designated deposit location of the target object, an approximated area or volume associated with each target object, and an assigned priority to the target object (e.g., the priority level of the target object may be determined as a function of the target object's approximated area or mass). In some embodiments, the information related to target objects that are determined by sorting control logic 206 includes location information. For example, location information includes one or more coordinates (e.g., along the X and Y axes as shown in FIG. 1) at which each target object was located in the image frame(s) that were input into sorting control logic 206. In a specific example, the location information of each target object is the coordinate of the centroid of the target object.

In some embodiments, sorting control logic 206 is configured to continuously store, at data storage 204, current attribute and location information corresponding to the current target objects that had been included in the input signal as "sets of current information associated with target objects." For example, sorting control logic 206 is configured to generate a set of current information associated with target objects based on each set of input signal(s) that is received from the object recognition device. Each set of current information associated with target objects may be stored with corresponding time information. Data storage 204 is further configured to store static information pertaining to the sorting system. Static information includes a model of the sorting robot. In some embodiments, the model of the sorting robot calculates an approximated length of time that the sorting robot is able to perform certain actions (e.g., pick up a target object, place a target object at a deposit location) for a given set of settings (e.g., the speed setting of the conveyor device and the acceleration setting of the sorting robot). For example, the model of the sorting robot is determined by empirically measuring the actual lengths of time that the sorting robot took to perform various actions during an observational period.

In some embodiments, replan logic 202 is configured to track the current state of the sorting system, which includes the current state of each of the picker mechanisms of a pick assembly that is coupled to the sorting robot, the current position/location of the sorting robot, and the current speed of the conveyor device. Depending on the type of a picker mechanism, a picker mechanism may have at least two states. For example, if a picker mechanism were a suction gripper, then the suction gripper can have at least the following two states: have not picked up a target object ("unoccupied") or have picked up a target object ("occupied"). In some embodiments, after the sorting robot and picker assembly performs an action, replan logic 202 updates the state of each picker mechanism of the picker assembly. In some embodiments, the current position/location of the sorting robot comprises a coordinate (e.g., within the sorting robot's frame of reference). For example, replan logic 202 is configured to update the state of each picker mechanism of the picker assembly and the current location of the sorting robot based on the action that was last completed by the sorting robot and picker assembly and/or based on an action completion signal that is sent back from the sorting robot/picker assembly to the sorting and planning device. Replan logic 202 is further configured to determine the current speed of the conveyor device. In some embodiments, the speed/velocity of the conveyor device is continuously measured with an encoder or other visual device that is attached to the conveyor belt.

Replan logic 202 is configured to determine one or more actions for the sorting robot and picker assembly to perform next and to send corresponding instructions to the sorting robot and/or picker assembly. In various embodiments, replan logic 202 is configured to determine one or more actions for the sorting robot and picker assembly to perform next per each "replan cycle." During each replan cycle, replan logic 202 obtains the most recent set of current information associated with target objects (e.g., that is stored at data storage 204 or is received from sorting control logic 206), static information associated with the sorting system stored at data storage 204 (e.g., the robot model), and the current state of the sorting system. Using the most recent set of current information associated with target objects, the static information associated with the sorting system, and the current state of the sorting system, replan logic 202 is configured to use a search technique to determine a sequence of actions that could be performed by the sorting robot and the picker assembly. Put another way, the sequence of actions is hypothetical because, in various embodiments, fewer than all the actions of the sequence will actually be caused by the sorting and planning device for the sorting device/picker assembly to perform.

In some embodiments, replan logic 202 is configured to determine the (hypothetical) sequence of actions by building a graph of nodes, where each node comprises a possible ("achievable") action to be taken by the sorting robot/picker assembly. For example, the graph search technique is A* search. The following is an example description of how replan logic 202 may use A* search to determine the sequence actions: Replan logic 202 first builds the initial node in the search graph as a function of, at least, the obtained current position of the sorting robot, the current time, and the most recent set of current information associated with target objects. Then, replan logic 202 is configured to determine successor nodes in the search graph relative to the initial node. The result of each action (e.g., a pick by a specific picker mechanism, a place by a specific picker mechanism, or a place by multiple specific picker mechanisms) that could be taken by the sorting robot/picker assembly is a successor node in the search graph. A node contains the action to carry out, the sorting robot's final position as a result of performing the node's action, and the time elapsed for all the actions since the initial node. This implies that the same action finished at a different time is considered a different node, since each action is time-dependent. A node's successors are those actions that are achievable after completion of the node's action. This would be a very large graph to compute ahead of time, since each pick of a target object can appear many times based on what time the action would finish. As such, an implicit graph may be used; when the search technique wants to visit a node's successors for the first time, they are generated based on the current node. The current node's successor nodes may be generated using the current location of the robot, picker mechanism states, current target objects on the conveyor device, conveyor speed, and static information like drop locations and the robot model. The search graph has a tree structure, since visiting/expansion from the same node from different paths is not permitted, given the continuous nature of timing. The search graph has a branching factor on the order of the number of target objects. The search graph does not have a single defined goal node. Instead, the graph has a goal manifold consisting of all nodes with no successors, i.e., all nodes where no further action is possible. In some embodiments, the search can terminate upon expanding the first node in the goal manifold, or continue generating better solutions until a deadline time has been reached.

In some embodiments, replan logic 202 is configured to build out the search graph by selecting to determine successor nodes from a current node based on the total estimated reward of a path through each successor node n, f(n). As will be described in further detail below, the reward that is determined for node n is a function of the total reward of all placed objects so far to reach node n, g(n), and the heuristic h(n), which is the estimated reward from node n to the goal manifold. Furthermore, the heuristic h(n) is a sum of the rewards of all target objects that are pickable (e.g., target objects that are within reach of the sorting robot given the current position of the sorting robot). In one example, reward r(o) of target object o is determined as a function of target object o's estimated area, A, and assigned priority, P, but can comprise any attributes (that are selected as optimization parameters) of target object o. As such, replan logic 202 builds the search graph by always selecting each subsequent current node (starting from the initial node) from which to generate further successor nodes based on the potential current node with the largest estimated reward, f(n). The path of nodes from the first successor node after the initial node to the last node in the goal manifold represents the paths of nodes (and therefore, their corresponding sequence of actions) that lead to the greatest reward of possible paths through the search graph.

In some embodiments, after the path from the first successor node after the initial node to the last node in the goal manifold in the search graph is determined, the sequence of actions is therefore determined by replan logic 202 as the series of actions comprising the action of each node within that path. In some embodiments, replan logic 202 is configured to select a subset of actions from the beginning of the sequence of actions for the sorting robot/picker assembly to actually perform. One reason to select only a subset of actions from a beginning of a sequence of actions is that the estimated reward of each node becomes less accurate further in time. In a specific example, replan logic 202 is configured to select the first action in the sequence of actions for the sorting robot/picker assembly to actually perform. After selecting the subset of the actions from the sequence of actions, replan logic 202 is configured to send instructions to the sorting robot/picker assembly to perform the selected action(s).

In some embodiments, after replan logic 202 sends instructions to the sorting robot/picker assembly to perform the selected action(s), the current replan cycle ends and a new replan cycle starts. In this new replan cycle, replan logic 202 is configured to obtain the most recent set of current information associated with target objects (e.g., that is stored at data storage 204 or is received from sorting control logic 206), static information associated with the sorting system stored at data storage 204 (e.g., the robot model), and the current state of the sorting system, and performs the process described above, again. As described herein, for each replay cycle, replan logic 202 is configured to determine a hypothetical sequence of actions (that leads to the greatest predicted reward) based on the latest current information associated with target objects and the latest state of the sorting system and then select a subset of actions from the sequence to cause the sorting robot/picker assembly to actually perform. Periodic replanning will be necessary due to new target objects being added to the conveyor device, changing conveyor belt speeds, and error in the robot model accumulating over multiple actions. Since the target replanning time per each replan cycle (e.g., replan logic 202 can find a full solution in under 16 ms) is less than the typical time it takes for the sorting robot/picker assembly to complete an action, replan logic 202 should be able to fully replan between each action. In some embodiments, a new replan cycle could also be triggered every time a new target object appears when the sorting robot is idle.

Figure 3:
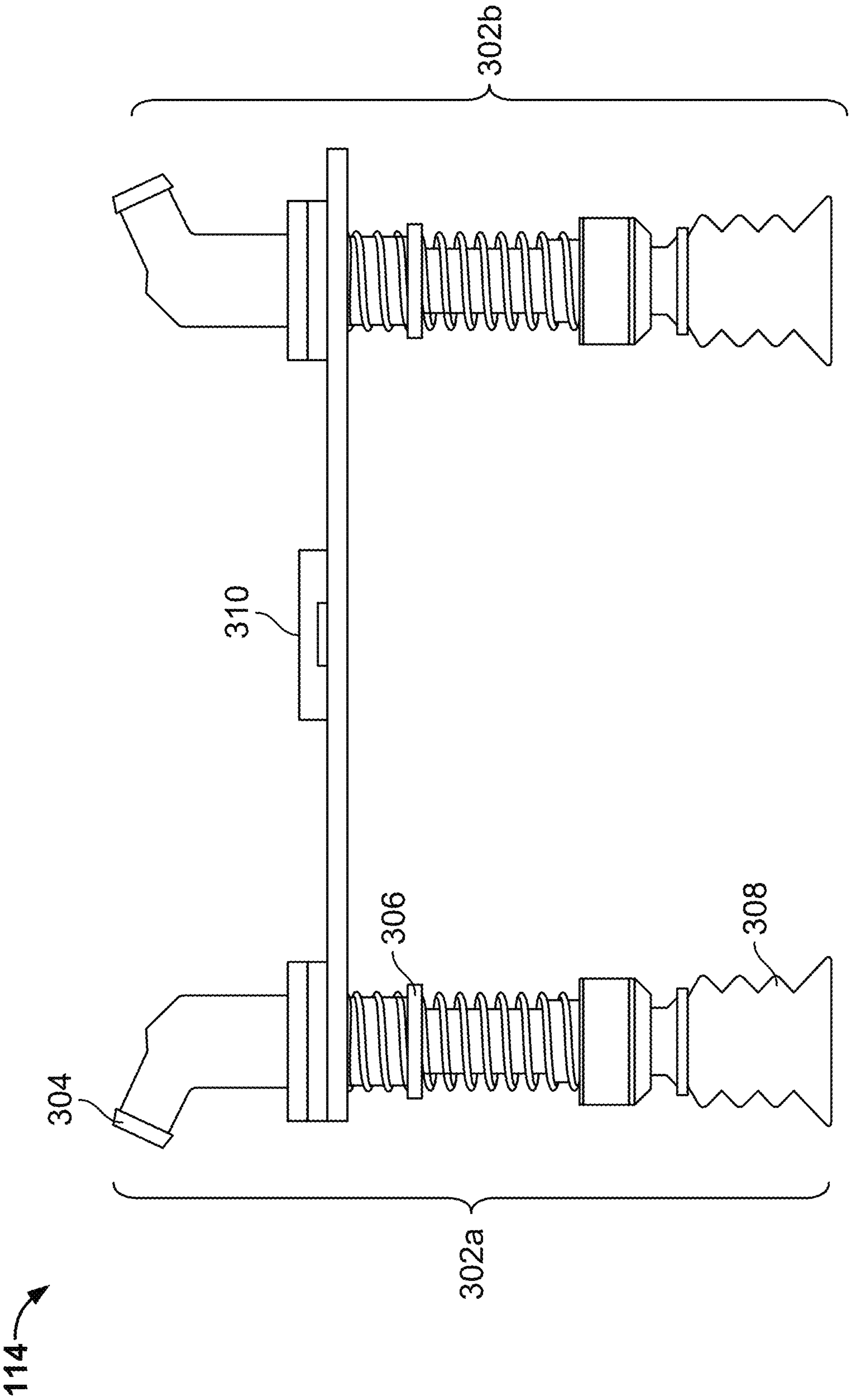
FIG. 3 is a diagram showing an example of a picker assembly.

FIG. 3 is a diagram showing an example of a picker assembly. In some embodiments, picker assembly 114 of system 100 of FIG. 1 may be implemented using the example picker assembly of FIG. 3. In the example of FIG. 3, the picker assembly includes two identical picker mechanisms, which are labeled as suction gripper 302*a* and suction gripper 302*b*. Given that suction gripper 302*a* and suction gripper 302*b* are identical, the features described herein for suction gripper 302*a* also apply to, but will not be repeated, for suction gripper 302*b*. Each of suction gripper 302*a* and suction gripper 302*b* is coupled to adapter plate 310, which can be coupled, directly or indirectly, to an actuator device such as a sorting robot. Suction gripper 302*a* uses suction cup 308 to pick/grip a target item (e.g., off a conveyor belt). Suction gripper 302*a* includes compressible assembly 306. Compressible assembly 306 includes an internal airflow passage ending in port 304 that is attachable to a hose or other means of transferring a vacuum from a vacuum generator. Compressible assembly 306 is also attached to suction cup 308 for gripping material. Each suction gripper 302*a* and 302*b* is associated with a respective position/location (e.g., coordinate) relative to the conveyor belt.

In various embodiments, each picker mechanism of a picker assembly, such as suction gripper 302*a* and suction gripper 302*b*, can individually pick up/grip a corresponding target object per an action that is instructed by the sorting and planner device (e.g., 102 of system 100 of FIG. 1). Furthermore, in various embodiments, the sorting robot/picker assembly can place/drop a single target object that is picked up by a corresponding picker mechanism into a corresponding deposit location per an action or place/drop more than one target objects that are picked up by a corresponding number of picker mechanisms into a single deposit location per an action. When more than one picker mechanism has picked up corresponding target objects, it is first determined whether all the picked up target objects can be placed into the same deposit location. For example, if all the picked up target objects are of the same material type, then all of the picked up target objects can be placed into the same deposit location. Otherwise, if two or more of the picked up target objects are to be placed into different deposit locations, then the two or more picked up target objects cannot be placed in a single action into the same deposit location and would need to be placed individually into respective deposit locations. As such, at any time, each picker mechanism of the picker assembly is in one of at least the following two states: 1) having not picked up a target object (which is sometimes referred to as "unoccupied") or 2) having picked up a target object (which is sometimes referred to as "occupied").

While the example picker assembly of FIG. 3 shows two picker mechanisms, in other examples, the picker assembly may have a single picker mechanism or more than two picker mechanisms. Fewer picker mechanisms per one picker assembly results in less target objects being picked up but also faster searching for a sequence of actions. More picker mechanisms per one picker assembly results in more target objects being picked up but also comparatively slower searching for a sequence of actions. While the example picker assembly of FIG. 3 shows each picker mechanism being a suction gripper, in other examples, each picker mechanism can be a type of gripper that is other than a suction gripper (e.g., a mechanical claw, magnetic assembly).

Figure 4:
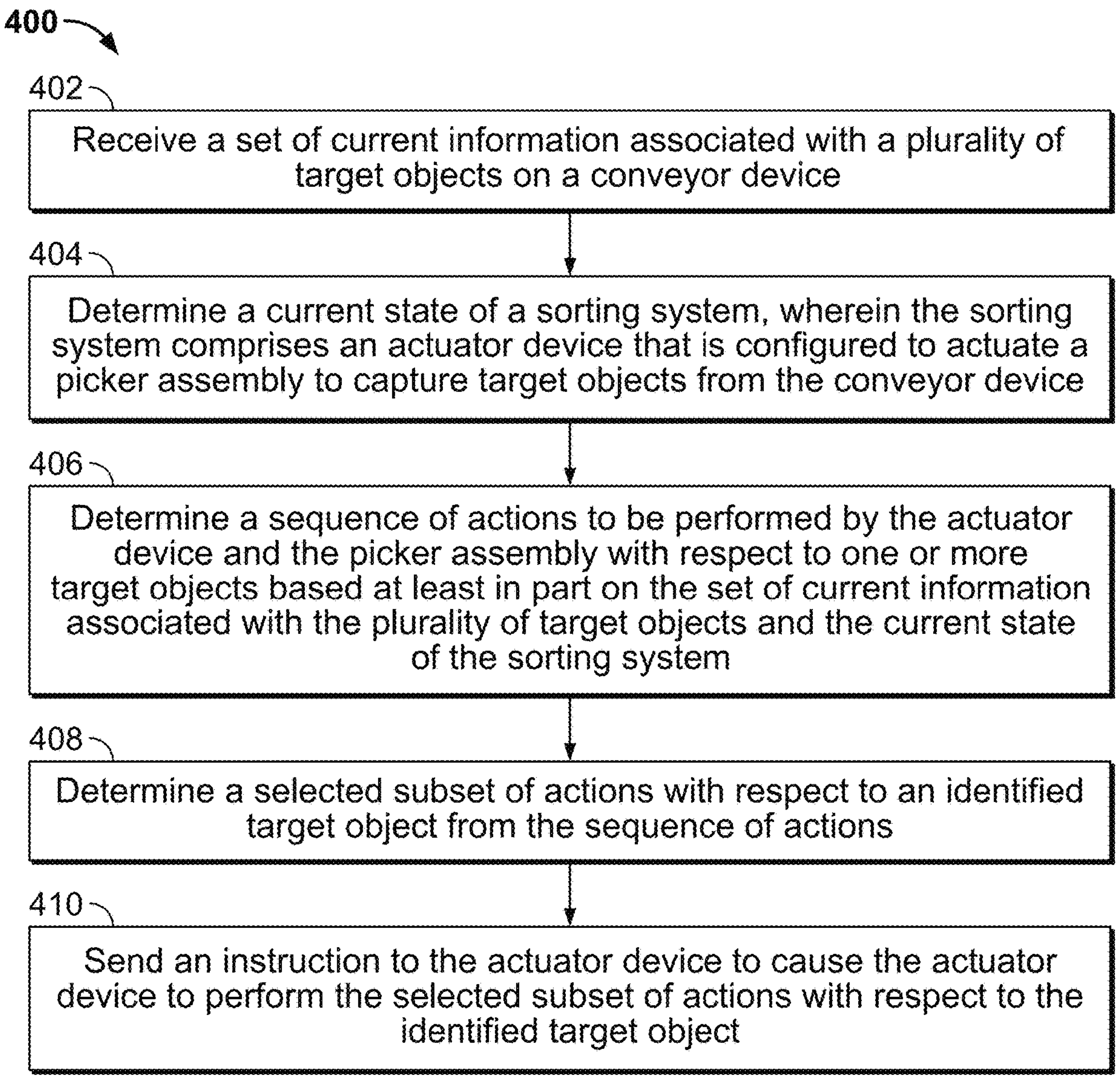
FIG. 4 is a flow diagram showing an embodiment of a process for planning object sorting.

FIG. 4 is a flow diagram showing an embodiment of a process for planning object sorting. In some embodiments, process 400 is implemented at sorting system 100 of FIG. 1. Specifically, in some embodiments, process 400 is implemented at sorting and planning device 102 of sorting system 100 of FIG. 1.

At 402, a set of current information associated with a plurality of target objects on a conveyor device is received. In some embodiments, the set of current information includes attribute information and location information associated with target objects that are identified from input signal(s) (e.g., image frames) sent from an object recognition device.

At 404, a current state of a sorting system is determined, wherein the sorting system comprises an actuator device that is configured to actuate a picker assembly to capture target objects from the conveyor device. In some embodiments, the current state of the sorting system includes the current time, the current position of the actuator device (e.g., a sorting robot), and the state of each picker mechanism of the picker assembly.

At 406, a sequence of actions to be performed by the actuator device and the picker assembly with respect to one or more target objects is determined based at least in part on the set of current information associated with the plurality of target objects and the current state of the sorting system. In some embodiments, static information such as a model corresponding to the actuator device is used to build a graph (e.g., using the A* search technique) to identify a path of nodes (where each node corresponds to one action to be performed by the actuator device and the picker assembly) to potentially be executed by the actuator device and the picker assembly. In some embodiments, the path of nodes is determined to be the path that leads to the greatest reward that is determined as a function of the rewards of individual target objects that could be placed in respective deposit locations.

At 408, a selected subset of actions is determined with respect to an identified target object from the sequence of actions. In some embodiments, only the first action of the sequence of actions is selected.

At 410, an instruction is sent to the actuator device to cause the actuator device to perform the selected subset of actions with respect to the identified target object.

In some embodiments, process 400 describes what is performed during one replan cycle and replan cycles can be repeated to determine each set of subsequent action(s) to be performed by the actuator device and picker assembly, as described in FIG. 5, below.

Figure 5:
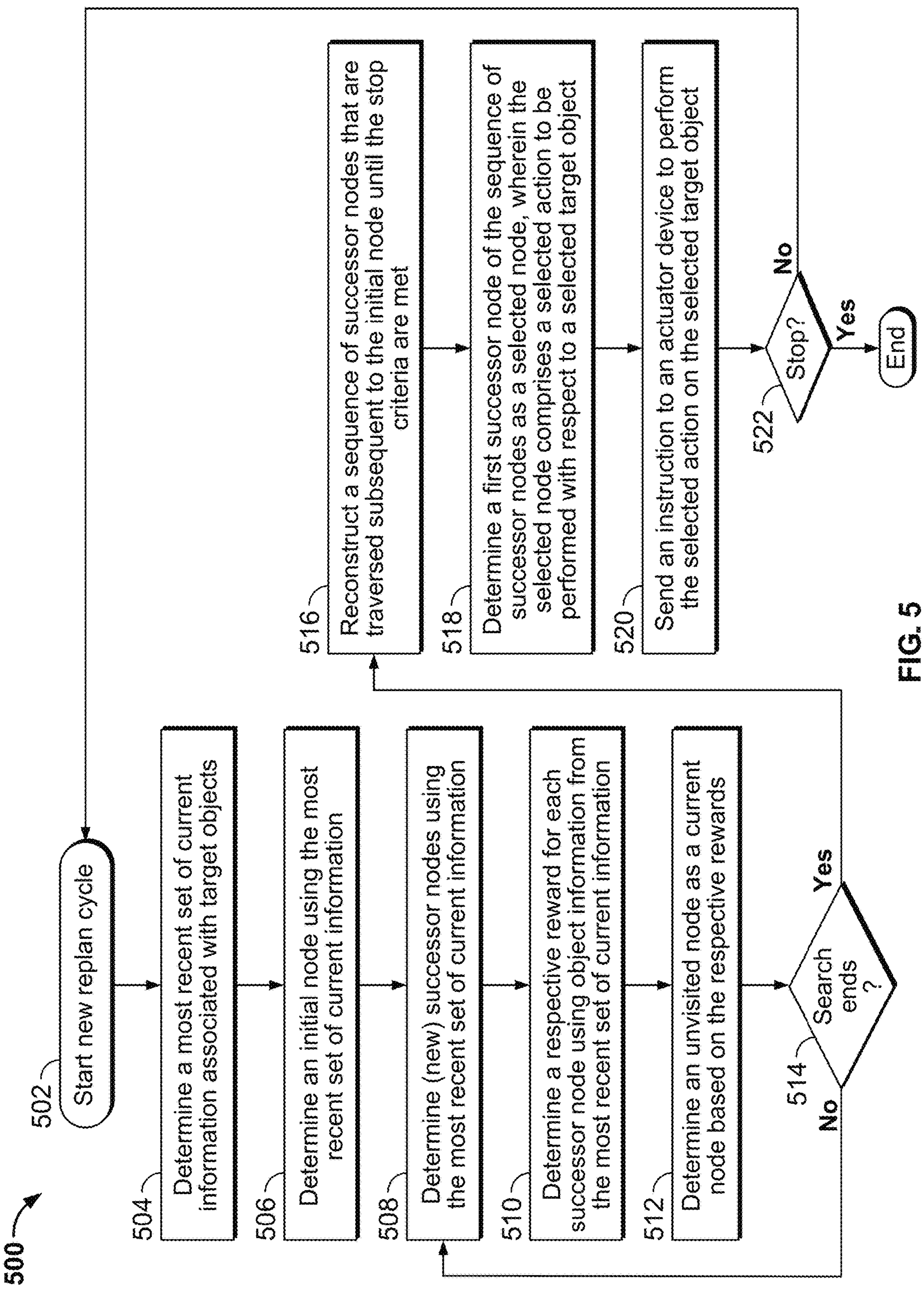
FIG. 5 is a flow diagram showing an example of a process for planning object sorting.

FIG. 5 is a flow diagram showing an example of a process for planning object sorting. In some embodiments, process 500 is implemented at sorting system 100 of FIG. 1. Specifically, in some embodiments, process 500 is implemented at sorting and planning device 102 of sorting system 100 of FIG. 1. In some embodiments, process 400 of FIG. 4 may be implemented using process 500.

Process 500 describes an example that shows the cyclic nature of replanning for each subsequent action to be performed by the actuator device and how each replan cycle includes a search using a A* search.

At 502, a new replan cycle is started. In some embodiments, a new replan cycle may start in response to an indication (e.g., user or programmatic instruction) to start the sorting process at the sorting system. In some embodiments, a new replan cycle may start in response to a determination that a previous instruction to the actuator device (e.g., sorting robot) to perform an action (e.g., to pick up a target object or to place a picked up target object) has been sent to the actuator device. In some embodiments, a new replan cycle may start in response to receiving a signal from the actuator device (e.g., sorting device) that it is almost done with a previously sent instruction. In some embodiments, a new replan cycle may start in response to detecting/recognition that a new target object has appeared on the conveyor device.

At 504, a most recent set of current information associated with target objects is determined. While sets of current information associated with target objects that are captured by an object recognition device are periodically generated to reflect the current target objects that can be captured by the object recognition device, in some embodiments, only the most recent and therefore, the most up-to-date set of current information associated with the target objects is used to plan the sequence actions, as will be described below. As mentioned above, a set of current information associated with target objects includes attribute information and location information of the target objects. Examples of attribute information include: a material type associated with each target object, an approximate mass associated with each target object, a designated deposit location of the target object, an associated geometry associated with each target object, an approximated area associated with each target object, an assigned priority to the target object, etc. Examples of location information include the coordinate of the respective centroid of each target object.

At 506, an initial node is determined using the most recent set of current information. In some embodiments, the initial node in the search graph that is built is determined as a function of the most recent set of current information on the target objects on the conveyor device, the current state of the sorting system, and static information related to the sorting system. In one specific example, the initial node is built to include the following information:

- A subset of the "pickable" target objects that (e.g., whose corresponding locations on the conveyor device) are either within a "pick region" (an area over which the conveyor device is reachable by the sorting robot) or will soon enter the pick region. These target objects are eligible to be picked up by the picker assembly.
- The current state of each picker mechanism (e.g., having picked up a target object or not having picked up a target object) within the picker assembly coupled to the sorting robot.
- The current position of the sorting robot (e.g., which can be determined based on the last action that was completed/instructed of the sorting robot).
- The current time.
- The current (e.g., measured, assumed, set) velocity/speed of the conveyor device.
- The model of the robot (e.g., that comprises a means to estimate the amount of time a hypothetical action would take).

In some embodiments, using the A* search technique, the reward, f(n), determined for node n is a function of the total reward of all placed objects so far to reach node n, g(n), and the heuristic h(n), which is the estimated reward from node n to the goal manifold. Because no objects have been placed yet in this instance of the search, g(n) is zero while h(n) is presumably non-zero, given a number of pickable target objects that remain on the conveyor device. A specific example of using the A* search technique is described below after the description of process 500.

The initial node does not include an action to be performed by the sorting robot and picker assembly but rather encapsulates a state of the sorting system for this new replan cycle.

Furthermore, in accordance with A*, the initial node is marked as "visited" and new successor nodes are generated based on the initial node.

At 508, (new) successor (nodes) are determined using the most recent set of current information. New successor nodes are generated relative to the initial node (at the first pass of step 508 in a replan cycle as described in process 500) or a current node (at a second or later pass of step 508 in a replan cycle as described in process 500). In some embodiments, each successor node is determined as a function of:

- A target object ID corresponding to the target object.
- An action that is achievable to be performed with respect to the target object of the target object ID given the previous node(s). Where there is more than one picker mechanism in a picker assembly, an achievable action includes both a picker mechanism ID and also an action type that is still achievable (e.g., possible) to be performed by the sorting robot and the picker assembly given the action(s) that led to this node, the action's start time, the target object's position (at the action's start time), and the velocity/speed of the conveyor device. For example, if Target Object O1 has already been picked by Picker 1 in a previous node, then the action of any picker mechanism picking up Target Object O1 is no longer possible. Examples of an action include: pick up by a picker mechanism ID, single place of a picked up target object by a picker mechanism ID, and an all place of all picked up target objects by all picker mechanisms. Because combinations of different picker mechanism IDs with the same action type with respect to the same target object are considered as unique actions, as the number of picker mechanisms in the picker assembly increases, the number of possible actions increases as well due to the greater number of combinations of specific picker mechanisms and action types. In a specific example, where there are two picker mechanisms, Picker A and Picker B, in the picker assembly, possible actions (with respect to different target objects) include:

(Pick, Picker A)

(Pick, Picker B)

(Single place, Picker A)

(Single place, Picker B)

(Double/all drop by Pickers A and B). Note that, in some embodiments, one action comprises multiple picker mechanisms placing/dropping their respective picked up target objects at once. However, this action is only permitted if it is determined that all of the picked target objects can be placed/dropped into the same deposit location. For example, multiple target objects that were picked up by the picker mechanisms of the picker assembly can be placed into the same deposit location if the target objects are of the same material type.

The remaining set of pickable target objects at the time the action of this successor node is expected to have completed. Given that the conveyor device is constantly moving and that each action performed by the sorting robot takes a non-zero amount of time, which target objects remain pickable (e.g., within or close to entering the sorting robot's pick region) after the sorting robot performs the action of this successor node must be determined as a function of the target object's predicted updated locations along the conveyor belt after the hypothetical completion by the sorting robot of the action of this successor node.

The resulting position of the sorting robot after performing the action of this successor node. This resulting position is determined based on at least the target object ID and action.

The resulting time after the action of this successor node is performed. For example, this resulting time is determined based on the target object ID, action, and the static robot model.

Each of the successor nodes is marked as "unvisited."

At 510, a respective reward is determined for each successor node using object information from the most recent set of current information.

As mentioned above, the reward, f(n), of each successor node is determined as a function of the total reward of all placed objects so far to reach node n, g(n), and the heuristic h(n), which is the estimated reward from node n to the goal manifold.

In some embodiments, a sorted data structure is used to store each successor node and its respective reward.

At 512, an unvisited node is determined as a current node based on the respective rewards.

A previously unvisited node is selected as a current node to visit, from which the A* search is to continue/expand from. For example, a previously unvisited node with the greatest reward is selected. The selected current node is then marked as having been "visited."

In some embodiments, a data structure stores each adjacent pair of nodes that was visited.

At 514, it is determined whether a set of stop criteria has been reached. In the event that the stop criteria have been met, the search ends and control is transferred to 514. Otherwise, in the event that the stop criteria have not been met, the search has not ended and control is returned to 508. In some embodiments, the stop criteria are sometimes referred to as the "goal manifold" and refer to conditions associated with stopping the search. An example stop criterion/goal manifold is the lack of ability to generate any further successor nodes (e.g., because no more actions are possible/achievable given the action(s) of the previous nodes).

At 516, a sequence of successor nodes that are traversed subsequent to the initial node until the stop criteria are met is reconstructed. The path comprising of the first successor node traversed after the initial node (which includes no action) and each node traversed through the last node corresponding to the stop criteria is reconstructed. In some embodiments, the path is reconstructed using the pairs of adjacently visited nodes stored in the data structure described above. In some embodiments, due to the technique of always selecting the successor node with the greatest reward to visit/serve as the current node, this path of nodes and therefore, corresponding sequence of actions is predicted to lead to the greatest overall reward.

At 518, a first successor node of the sequence of successor nodes is selected as a selected node, wherein the selected node comprises a selected action to be performed with respect to a selected target object. While the path of nodes and therefore, corresponding sequence of actions that is predicted to lead to the greatest overall reward is determined, in some embodiments, only the first node of the sequence is selected for the sorting robot and the picker assembly to actually perform the action corresponding to the first node. One reason is because it is expected that the accuracy of the predicted rewards attainable by the sorting system over the actions of the determined sequence decrease over time (i.e., as more actions of the sequence are performed) due to the movement/placement of the target objects on the moving conveyor device and accumulation of error from using the robot model. As such, new replan cycles are continuously performed to use the most current information on the target objects.

At 520, an instruction is sent to an actuator device to perform the selected action on the selected target object.

At 522, it is determined whether there will be at least one more replan cycle. In the event that there will be at least one more replan cycle, control is returned to 502. Otherwise, in the event that there will not be at least one more replan cycle, process 500 ends. For example, a new replan cycle may not be performed in the event that the sorting system is shut down and/or there are no more target objects on the conveyor device.

The following is a description of a specific example application of the A* search technique that can be used to build a search graph and to search for the sequence of actions that leads to the greatest reward, in accordance with some embodiments:

As described above, the result of each action (e.g., a pick or place of a target object) is a node in a search graph. As described above, a node contains the action to carry out, the actuator device's (e.g., the sorting robot's) final position, and the time elapsed for all the actions since the initial node. This implies that the same action finished at a different time is considered as a different node, since each action is time-dependent. A node's successors are those actions that are achievable after completion of the node's action.

The search graph size is potentially very large, so instead of constructing it in full, it is represented as an implicit graph; when the search wants to visit a node's successors for the first time, the successors are generated based on the current node—using, for example, the current location of the sorting robot, the current states of the picker mechanisms, the remaining target objects on the belt, conveyor speed, and static information like deposit locations and the robot model.

The search graph has a tree structure, since the same node is not expected nor permitted to be visited from different paths given the continuous nature of timing. The search graph has a branching factor on the order of the number of objects. The search graph does not have a single defined goal node and instead has a goal manifold consisting of all nodes with no successors, i.e., all nodes where no further action is possible/achievable. The search can terminate upon expanding the first node in the goal manifold, or continue generating better solutions until a deadline time has been reached.

Determining Achievable Actions

An achievable action by a picker mechanism is one that is possible given the current state of the picker mechanism (e.g., can only perform a pick action with an unoccupied picker mechanism, and can only perform a place action with an occupied picker mechanism), and is a possible movement for the sorting robot given the action's start time and the target object's position and the velocity/speed of the conveyor device. As mentioned above, a static robot model (e.g., that was generated using empirically-measured estimates of how much time it will take for the sorting robot to execute each action) can be used to determine which actions (to be associated with one or more successor nodes) are achievable from a node in the search graph.

Definitions

The A* search expands paths that have high estimated reward by using this function:

$$f(n)=g(n)+h(n) \quad (1)$$

f(n) represents the total estimated reward of the path through node n.

g(n) represents the reward so far to reach node n.

h(n) represents the estimated reward from node n to goal.

In one example, the reward for a node is the sum of the rewards for the target objects it correctly places is:

$$g(n)=\text{sum of } r(o) \text{ for all placed target objects } o \quad (2)$$

Where r(o) is the reward function for a single object o. r(o) is a function of the target object's information. In a specific example, the target object's information that is used to determine its corresponding reward value is the target object's priority and area.

In one example, h(n), which estimates the reward from node n to the goal manifold allows the search technique to explore the best possibilities first, as long as it is admissible. It can be defined as the sum of the rewards of the target objects that are achievable to be picked up from the current node. In reality, not all might actually be achievable if picked in sequence.

$$h(n)=\text{sum of } r(o) \text{ for all target objects } o \text{ pickable from node } n \quad (3)$$

For example, at the current node, target object X is picked by a picker mechanism. Target object Y is pickable afterwards, and target object Z is pickable afterwards, but it is not possible to pick both Y and Z after X. h(n) counts the reward of both Y and Z, an overestimate.

If the heuristic function provides an exact estimate in the case of only 1 or 0 pickable objects remaining, the first node expanded into the goal manifold will be a maximum-reward solution. Every node in the goal manifold has some predecessor with one or zero pickable objects available. If the heuristic, in this case, makes the same calculation of achievability as the node-successor generation does, the heuristic will predict the actual reward. With knowledge of the actual reward before reaching any goal node, A* will not expand to a goal node unless it has the best actual reward.

A node in the goal manifold (i.e., a node that meets a stop criteria of the A* search) is a node that has no more successor nodes because there are no further achievable actions. For example, a node is in the goal manifold if none of the picker mechanisms of the picker assembly are occupied and the position of the sorting robot at the time of the completion of the action associated with the goal manifold node is such that there are no pickable objects that are reachable by the sorting robot given the positions of the target objects at that time and the velocity/speed of the conveyor belt. A node is not in the goal manifold if at least one picker mechanism is occupied, because at least one successor node can be generated. The at least one successor node will include the action of placing the picked up target object(s) into their corresponding deposit location.

Figure 6:
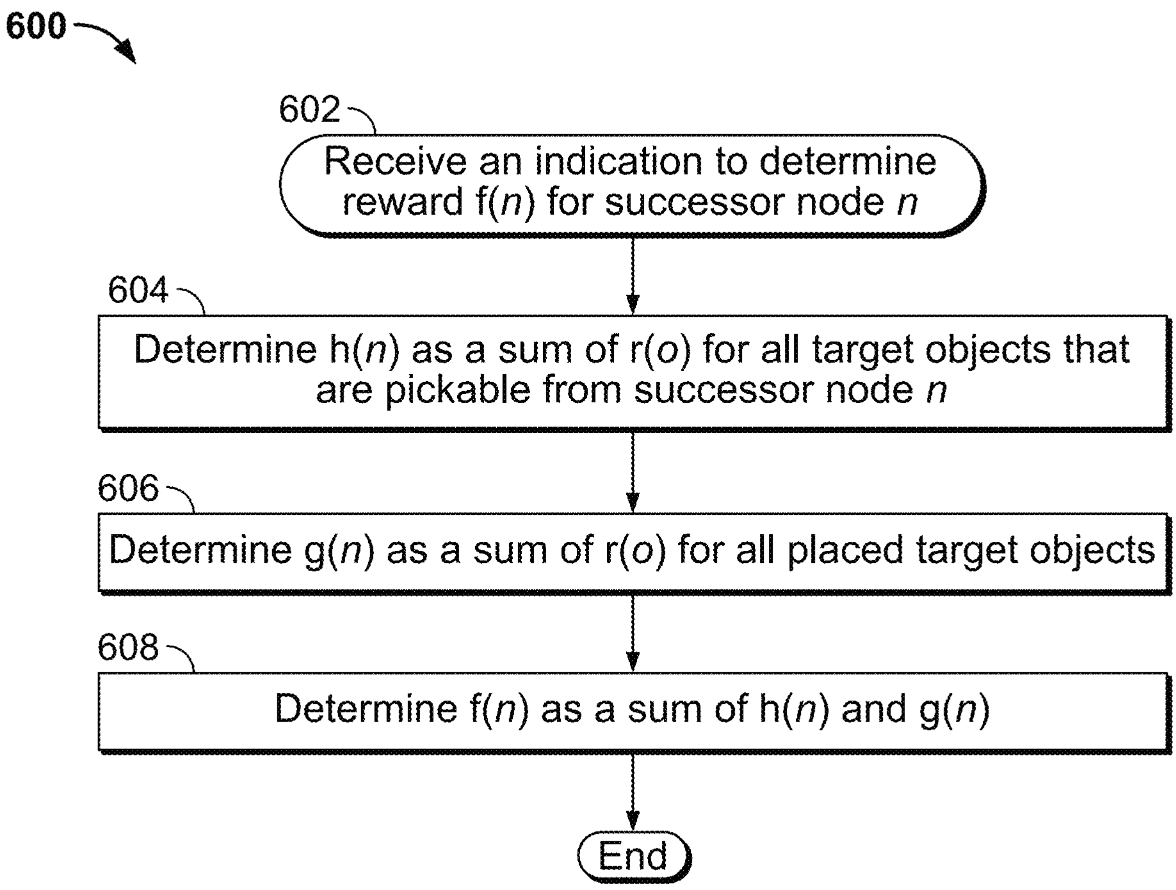
FIG. 6 is a flow diagram showing an example of a process for determining a reward corresponding to a successor node.

FIG. 6 is a flow diagram showing an example of a process for determining a reward corresponding to a successor node. In some embodiments, process 600 is implemented at sorting system 100 of FIG. 1. Specifically, in some embodiments, process 600 is implemented at sorting and planning device 102 of sorting system 100 of FIG. 1. In some embodiments, step 510 of process 500 of FIG. 5 may be implemented using process 600.

Process 600 describes an example process of determining the reward f(n) for a successor node n based on the example formulations (1, 2, and 4) of f(n), h(n), and g(n), respectively, that are described above.

At 602, an indication to determine reward f(n) for successor node n is received.

At 604, h(n) is determined as a sum of r(o) for all target objects that are pickable from successor node n.

At 606, g(n) is determined as a sum of r(o) for all placed target objects.

At 608, f(n) is determined as a sum of h(n) and g(n).

Figure 7A:
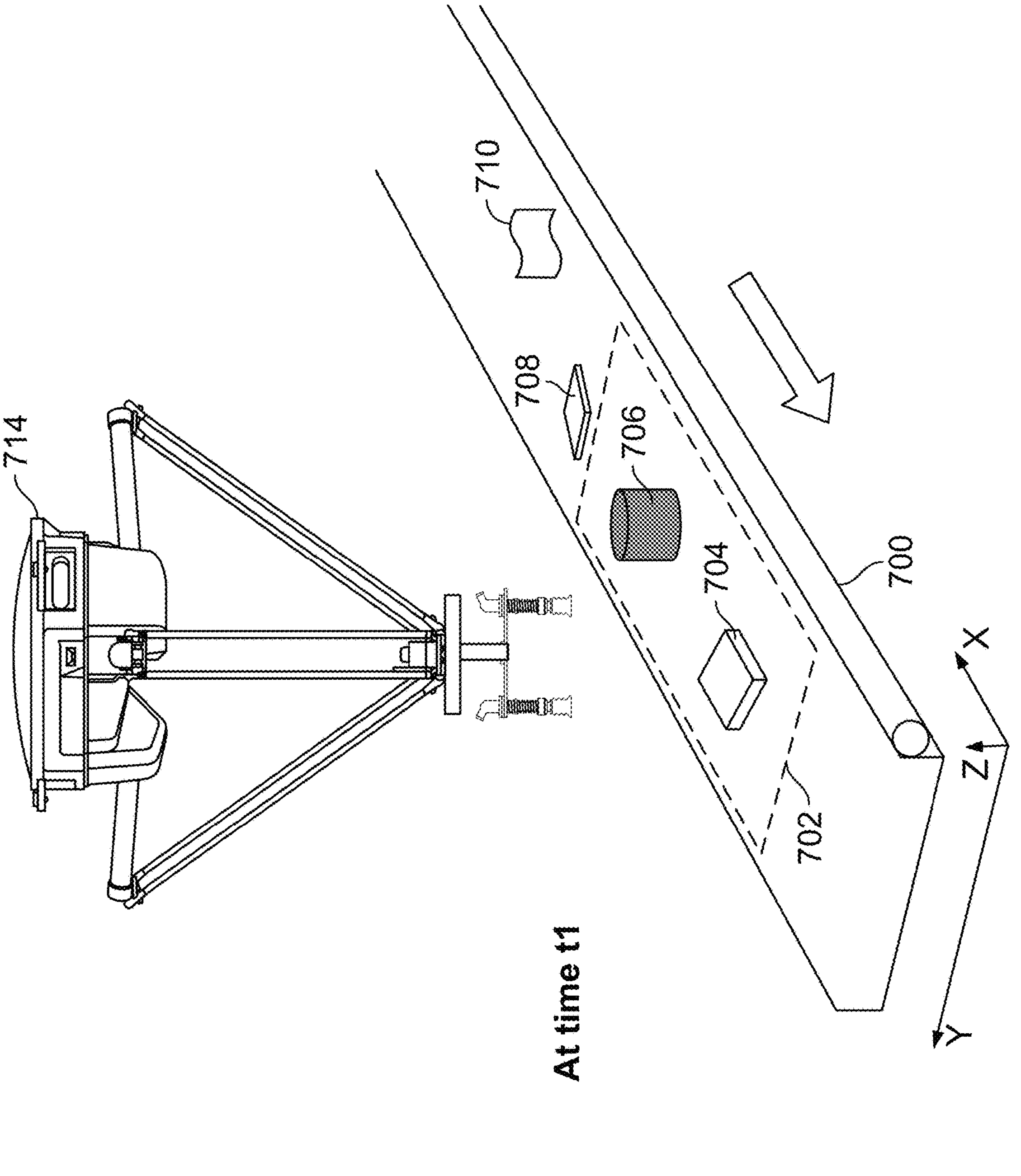
FIGS. 7A and 7B are diagrams that show example target objects on a conveyor belt relative to a pick region of a sorting robot at two different times, t1 and t2, in accordance with some embodiments.
Figure 7B:
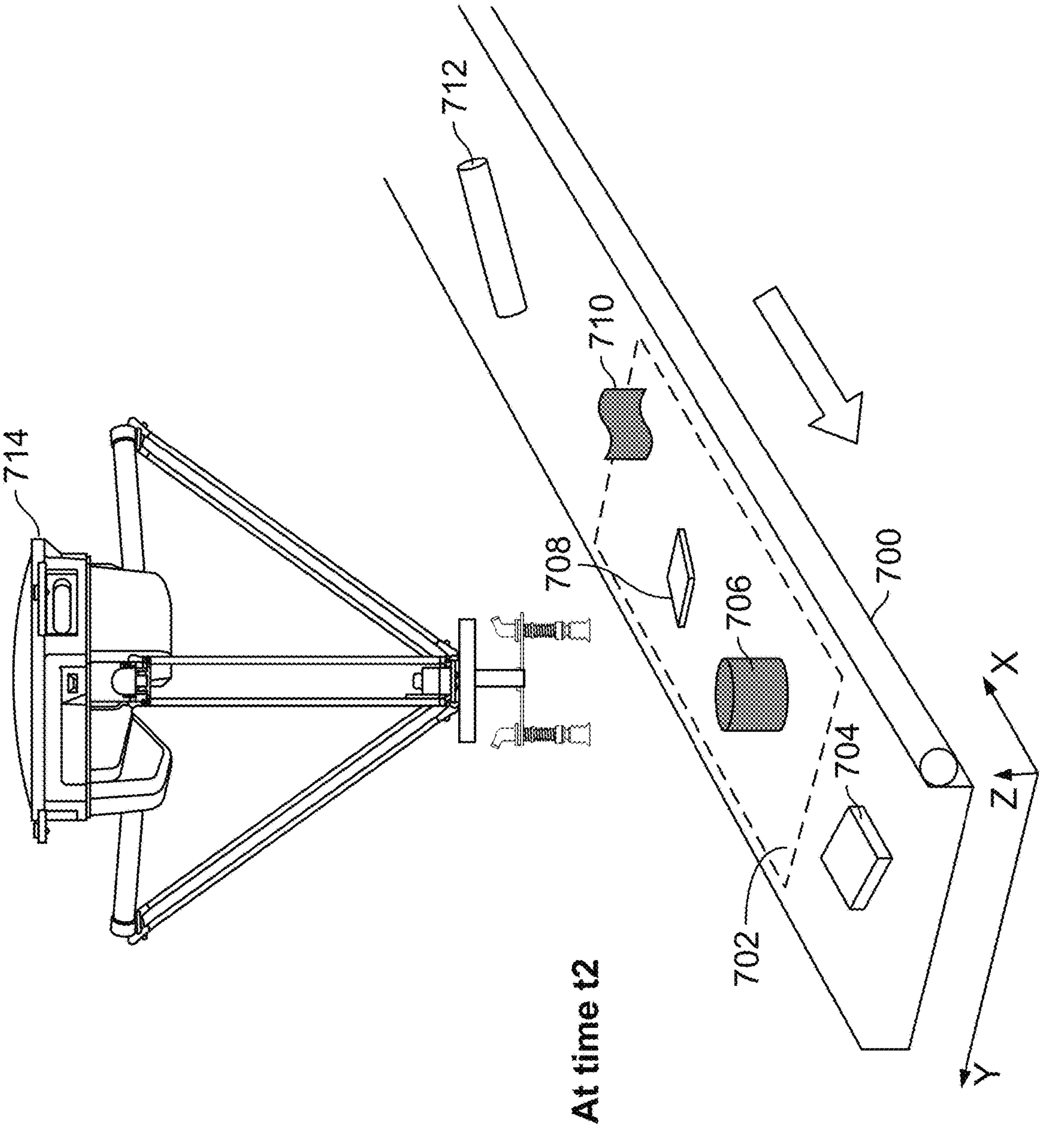

FIGS. 7A and 7B are diagrams that show example target objects on a conveyor belt relative to a pick region of a sorting robot at two different times, t1 and t2, in accordance with some embodiments. As mentioned above, a "pick region" (or sometimes referred to as "pick zone") of an actuator device is an area of the conveyor belt that is reachable by the actuator device. In the examples of FIGS. 7A and 7B, the actuator device is sorting robot 714 and its pick region is shown as pick region 702 on conveyor belt 700. For example, pick region 702 can be defined by four coordinates on conveyor belt 700. Because conveyor belt 700 is moving at a (e.g., constant) velocity (e.g., along the X-axis), the positions of the target objects thereupon are constantly changing and also, new target objects enter and exit from pick region 702 over time.

As described above, in some embodiments, target objects that are either within a pick region or will soon enter (e.g., with a predetermined length of time) are considered "pickable" target objects in a replan cycle for determining a sequence of actions for the actuator device. In FIG. 7A, the positions, at time t1, of target objects 704, 706, 708, and 710 are shown in relation to pick region 702. Because the positions of target objects 704 and 706 are within pick region 702 and the position of target object 708 is soon to enter pick region 702, target objects 704, 706, and 708 are all considered "pickable" for sorting robot 714 at time t1. In FIG. 7B, the updated positions, at time t2, of target objects 704, 706, 708, and 710 and the position of newly appearing target object 712 are shown in relation to pick region 702. Time t2 is later than time t1 and as such, the positions of target objects 704, 706, 708, and 710 have all moved further along conveyor belt 700 relative to their positions shown in FIG. 7A. As such, in FIG. 7B, the positions of target objects 706, 708, and 710 are (at least partially) within pick region 702, and therefore, target objects 706, 708, and 710 are all considered "pickable" for sorting robot 714 at time t2. However, at time t2, the updated position of target object 704 is no longer in pick region 702 and therefore, target object 704 is no longer considered "pickable" at time t2.

Given whether a target object is "pickable" (e.g., the target object is within or soon to enter pick region 702 in FIGS. 7A and 7B) or not is determined as a function of time underscores the importance of considering the time at which different actions associated with nodes are to be performed during a replan cycle (e.g., such as described in process 500 of FIG. 5). Specifically, with respect to the example A* search described above, which target objects are pickable at a given time will therefore impact the determination of which successor nodes, if any, can be generated from a current node.

Figure 8A:
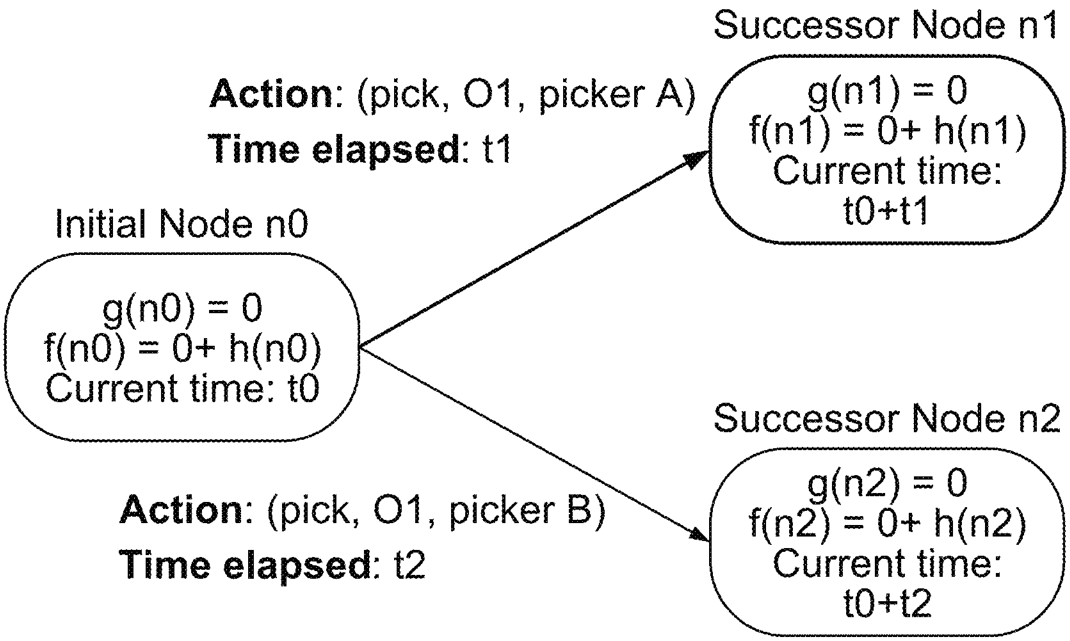
FIGS. 8A and 8B are diagrams that show an example search graph that is built to determine a sequence of actions to be performed by an actuator device and a picker assembly, in accordance with some embodiments.
Figure 8B:
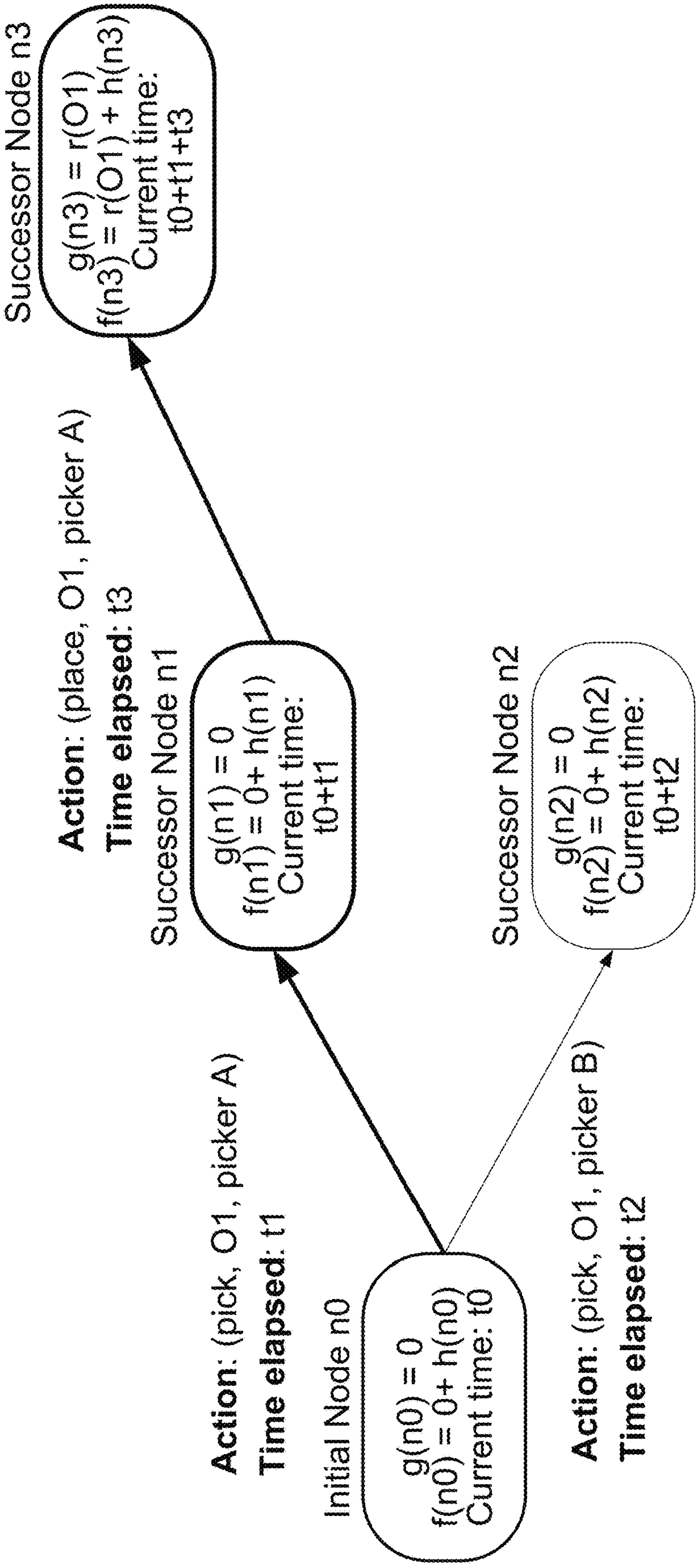

FIGS. 8A and 8B are diagrams that show an example search graph that is built to determine a sequence of actions to be performed by an actuator device and a picker assembly, in accordance with some embodiments. In the example of FIGS. 8A and 8B, the actuator device is a sorting robot that is coupled to a picker assembly that includes two picker mechanisms, picker A and picker B. In FIG. 8A, for example, Initial Node n0 is built at the top of a new replan cycle (e.g., such as described in process 500 of FIG. 5). The g(n0) of Initial Node n0 is zero because no target objects have been placed so far. Thus, f(n0) of Initial Node n0 is only a function of h(n0). As shown in FIG. 8A, from Initial Node n0, two successor nodes are determined, Successor Nodes n1 and n2. Each of Successor Nodes n1 and n2 corresponds to an achievable action relative to the state of the sorting system (e.g., the position of the sorting robot, the state of picker mechanisms, and the list of pickable target objects at time t0) associated with Initial Node n0. The achievable action corresponding to Successor Node n1 includes to pick up target object O1 using picker mechanism A and the achievable action corresponding to Successor Node n2 includes to pick up target object O1 using picker mechanism B. The estimated time that will be elapsed in performing the action corresponding to Successor Node n1 (e.g., as determined by the static robot model) is t1. The estimated time that will be elapsed in performing the action corresponding to Successor Node n2 (e.g., as determined by the static robot model) is t2. t1 may be different than t2 given the different positions of picker A and picker B of the picker assembly. As shown in FIG. 8A, g(n1) is still zero for Successor Node n1 because still no target objects have been placed yet. f(n1) corresponding to Successor Node n1 includes only h(n1), which is determined for Successor Node n1 based on the current time of t0+t1 (i.e., h(n1) is determined based on the predicted positions of the target objects at time t0+t1). Similarly, g(n2) is still zero for Successor Node n2 because still no target objects have been placed yet. f(n2) corresponding to Successor Node n2 includes only h(n2), which is determined for Successor Node n2 based on the current time of t0+t2 (i.e., h(n2) is determined based on the predicted positions of the target objects at time t0+t2).

In the example of FIGS. 8A and 8B, assume that between Successor Nodes n1 and n2, Successor Node n2 is selected to be visited first because its reward f(n2) is greater than reward f(n1) of Successor Node n1. However, for the purpose of illustration, assume that no successor can be generated for Successor Node n2 (e.g., no pickable objects can be picked up by unoccupied picker A given the current position of the sorting robot and the robot model). As such, once Successor Node n2 has been visited and no successor nodes could be generated thereof, the A* search identifies the next unvisited successor node with the greatest reward, Successor Node n1, to be the next current node. As shown in FIG. 8B, for the purpose of illustration, assume only a single successor node, Successor Node n3 can be generated given Successor Node n1. Successor Node n3 corresponds to an achievable action relative to the state of the sorting system (e.g., the position of the sorting robot, the state of picker mechanisms, and the list of pickable target objects at time t0) associated with Successor Node n1. The achievable action corresponding to Successor Node n3 includes to place picked up target object O1 using picker mechanism A. The estimated time that will be elapsed in performing the action corresponding to Successor Node n3 (e.g., as determined by the static robot model) is t3. As shown in FIG. 8B, g(n3) is now r(O1) for Successor Node n3 and target object O1 has been successfully placed into its deposit location. h(n3) is determined for Successor Node n3 based on the current time of t0+t1+t3 (i.e., h(n3) is determined based on the predicted positions of the target objects at time t0+t1+t3). f(n3) corresponding to Successor Node n3 is therefore the sum of g(n3) (=r(O1)) and h(n3). For the purpose of the illustration, assume that Successor Node n3 is in the goal manifold (i.e., Successor Node n3 meets the stop criteria of the search). As such, the search is over and the path/sequence of successor nodes after Initial Node n0 through the successor node in the goal manifold, which is the path that leads to the greatest reward, is determined as: Successor Node n1 to Successor Node n3. In some embodiments, the first node in that sequence, Successor Node n1, is selected and its corresponding action of picking up target object O1 using picker mechanism A is included in an instruction to the sorting robot and the picker assembly for the sorting robot and the picker assembly to perform that action. As such, despite there being two successor nodes, and therefore, two corresponding actions in the sequence of nodes/actions determined in the example of FIGS. 8A and 8B, only the first node/action may be selected to be performed.

Figure 9:
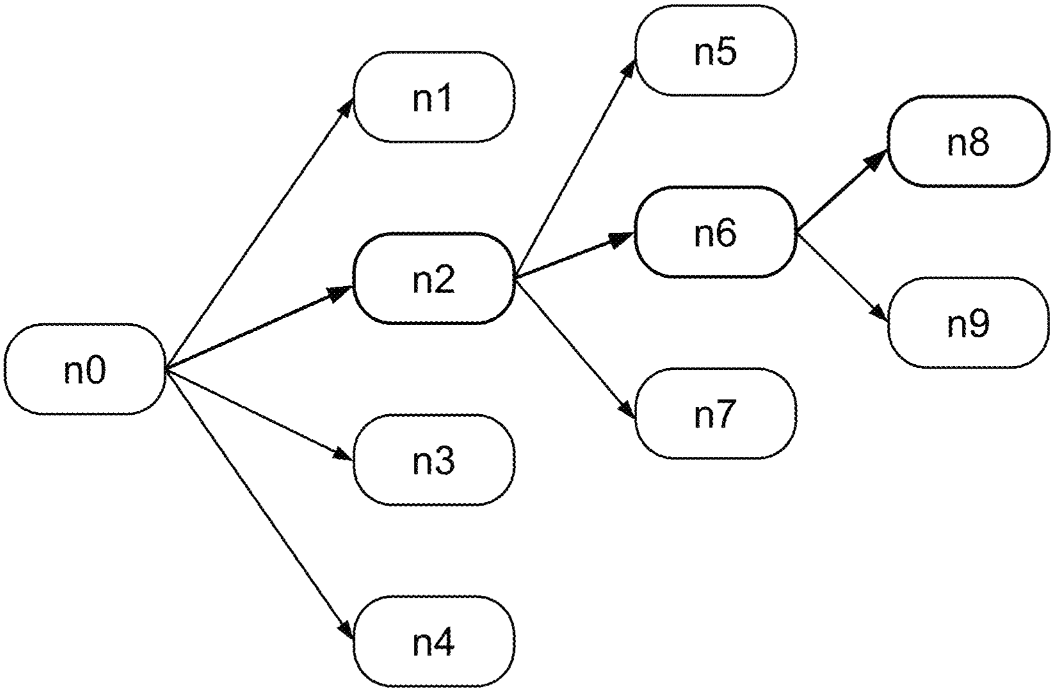
FIG. 9 is a diagram showing another example of a search graph that is built to determine a sequence of actions to be performed by an actuator device and a picker assembly, in accordance with some embodiments.

FIG. 9 is a diagram showing another example of a search graph that is built to determine a sequence of actions to be performed by an actuator device and a picker assembly, in accordance with some embodiments. In the example of FIG. 9, from initial node n0, successor nodes n1, n2, n3, and n4 were generated. From among successor nodes n1, n2, n3, and n4, successor node n2 was visited/selected as the current node because n2 had the largest reward, f(n2). Based on selected successor node n2, successor nodes n5, n6, and n7 were generated. Then, from the unvisited successor nodes n1, n3, n4, n5, n6, and n7, successor node n6 was visited/selected as the current node because n6 had the largest reward, f(n6). Based on selected successor node n6, successor nodes n8 and n9 were generated. Then, from the unvisited successor nodes n1, n3, n4, n5, n7, n8, and n9, successor node n9 was visited/selected as the current node because n9 had the largest reward, f(n9). However, no further successor nodes were able to be generated from successor node n9. Next, from the unvisited successor nodes n1, n3, n4, n5, n7, and n8, successor node n8 was visited/selected as the current node because n8 had the largest reward, f(n8). It is then determined that successor node n8 is in the goal manifold and therefore, the A* search is finished. As such, the path/sequence of successor nodes after initial node n0 through the successor node in the goal manifold, which is the path that leads to the greatest reward, is determined as: successor node n2, successor node n6, and successor node n8. In some embodiments, the first node in that sequence, successor node n2, is selected and its corresponding action is included in an instruction to the actuator device (e.g., a sorting robot) and the picker assembly for the sorting robot and the picker assembly to perform that action. As such, despite there being three successor nodes in the sequence, and therefore, three corresponding actions in the sequence of nodes/actions determined in the example of FIG. 9, only the first node/action may be selected to be performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A sorting system, comprising:

a processor configured to:

receive a set of current information associated with a plurality of target objects on a conveyor device;

determine a current state of the sorting system, wherein the sorting system comprises an actuator device that is configured to actuate a picker assembly to capture target objects from the conveyor device, wherein the picker assembly comprises a plurality of picker mechanisms, and wherein the current state of the sorting system comprises a state of a picker mechanism of the plurality of picker mechanisms, wherein the state of the picker mechanism comprises either available for capturing an object or unavailable for capturing the object;

generate a graph of nodes, wherein the graph of nodes comprises a tree structure of successor nodes that expands from an initial node, wherein the successor nodes of the tree structure are time-dependent, wherein the successor nodes comprise a set of first successor nodes that comprises a set of first achievable actions that could be performed with respect to a first set of target objects relative to the initial node, wherein at least one first successor node branches out into a respective set of second successor nodes that comprises a set of second achievable actions that could be performed with respect to a second set of target objects given a performance of a respective first achievable action associated with a respective first successor node, wherein the initial node is determined based on the set of current information associated with the plurality of target objects and the current state of the sorting system, wherein the successor nodes are generated based at least in part on a model of the actuator device, wherein the model of the actuator device comprises approximated lengths of time in which the actuator device is able to perform each of a plurality of actions with respect to objects at a given set of settings associated with the sorting system;

select a path within the graph of nodes, wherein the path corresponds to a sequence of a plurality of hypothetical actions to be performed by the actuator device and the picker assembly, over a sequence of points in time, with respect to one or more target objects;

determine a selected subset of the plurality of hypothetical actions with respect to an identified target object from the sequence of the plurality of hypothetical actions; and send an instruction to the actuator device to cause the actuator device and the picker assembly to perform the selected subset of the plurality of hypothetical actions with respect to the identified target object; and a memory coupled to the processor and configured to provide the processor with instructions.

2. The sorting system of claim 1, wherein the processor is further configured to:

receive an input signal from an object recognition device; and determine the set of current information associated with the plurality of target objects based at least in part on the input signal.

3. The sorting system of claim 1, wherein the current state of the sorting system comprises one or more of the following: a current time and a current position of the actuator device.

4. The sorting system of claim 1, wherein the respective first achievable action relative to the initial node comprises an action that the actuator device is able to perform based at least in part on one or more of the following: a current position of the actuator device, the state of the picker mechanism of the plurality of picker mechanisms, and a predicted position of a target object on which the action is to be performed.

5. The sorting system of claim 1, wherein to generate the graph of nodes further comprises to:

determine a respective reward corresponding to the at least one first successor node based at least in part on the set of current information associated with the plurality of target objects, wherein the respective reward corresponding to the at least one first successor node is determined based at least in part on a first reward value of target object(s) that have been deposited to reach the at least one first successor node, wherein the first reward value of the target object(s) that have been deposited is determined based at least in part on areas corresponding to the target object(s) that have been deposited; and determine an unvisited first successor node as a current node based at least in part on respective rewards corresponding to the set of first successor nodes.

6. The sorting system of claim 5, wherein the respective reward corresponding to the at least one first successor node is further determined based at least in part on a second reward value corresponding to target object(s) that are pickable by the actuator device from the respective at least one first successor node, wherein the second reward value of the target object(s) that are pickable is determined based at least in part on second areas corresponding to the target object(s) that are pickable by the actuator device from the at least one first successor node.

7. The sorting system of claim 1, wherein the selected subset of the plurality of hypothetical actions comprises an action corresponding to a successor node that is first in the selected path.

8. The sorting system of claim 1, wherein the plurality of picker mechanisms comprises a plurality of suction grippers.

9. The sorting system of claim 8, wherein the plurality of suction grippers apply vacuum force to pick up target objects.

10. The sorting system of claim 1, wherein the actuator device comprises a sorting robot.

11. The sorting system of claim 1, wherein:

the at least one first successor node includes: a first target object identifier, the respective first achievable action to be performed on a first target object associated with the first target object identifier by a first specified picker mechanism of the plurality of picker mechanisms, a first resulting position of the actuator device after completion of the respective first achievable action, and a first estimated resulting time after the completion of the respective first achievable action; and a second successor node that includes: a second target object identifier, a second achievable action to be performed on a second target object associated with the second target object identifier by a second specified picker mechanism of the plurality of picker mechanisms, a second resulting position of the actuator device after completion of the second achievable action, and a second estimated resulting time after the completion of the second achievable action, wherein the second achievable action is determined based at least in part on the respective first achievable action, the first resulting position of the actuator device after completion of the respective first achievable action, and the first estimated resulting time after the completion of the respective first achievable action.

12. The sorting system of claim 11, wherein the respective first achievable action comprises to pick up the first target object by the first specified picker mechanism, wherein the second achievable action comprises to pick up the second target object by the second specified picker mechanism, and wherein at least one second successor node branches out to:

a third successor node that includes: the first target object identifier, the second target object identifier, a third achievable action comprising to deposit both the first target object and the second target object into a deposit location, a third resulting position of the actuator device after completion of the third achievable action, and a third estimated resulting time after the completion of the third achievable action, wherein the third achievable action is determined based at least in part on the second achievable action, the third resulting position of the actuator device after completion of the second achievable action, and the third estimated resulting time after the completion of the second achievable action.

13. The sorting system of claim 11, wherein the at least one first successor node further comprises a remaining set of pickable target objects comprising target objects that are within or close to entering a pick region associated with the actuator device, wherein the pick region comprises an area over the conveyor device that is reachable by the actuator device.

14. The sorting system of claim 1, wherein the generation of the graph of nodes ends in response to either expanding a successor node into a goal manifold or until a deadline time has been reached.

15. A method, comprising:

receiving a set of current information associated with a plurality of target objects on a conveyor device;

determining a current state of a sorting system, wherein the sorting system comprises an actuator device that is configured to actuate a picker assembly to capture target objects from the conveyor device, wherein the picker assembly comprises a plurality of picker mechanisms, and wherein the current state of the sorting system comprises a state of a picker mechanism of the plurality of picker mechanisms, wherein the state of the picker mechanism comprises either available for capturing an object or unavailable for capturing the object;

generating a graph of nodes, wherein the graph of nodes comprises a tree structure of successor nodes that expands from an initial node, wherein the successor nodes of the tree structure are time-dependent, wherein the successor nodes comprise a set of first successor nodes that comprises a set of first achievable actions that could be performed with respect to a first set of target objects relative to the initial node, wherein at least one first successor node branches out into a respective set of second successor nodes that comprises a set of second achievable actions that could be performed with respect to a second set of target objects given a performance of a respective first achievable action associated with a respective first successor node, wherein the initial node is determined based on the set of current information associated with the plurality of target objects and the current state of the sorting system, wherein the successor nodes are generated based at least in part on a model of the actuator device, wherein the model of the actuator device comprises approximated lengths of time in which the actuator device is able to perform each of a plurality of actions with respect to objects at a given set of settings associated with the sorting system;

selecting a path within the graph of nodes, wherein the path corresponds to a sequence of a plurality of hypothetical actions to be performed by the actuator device and the picker assembly, over a sequence of points in time, with respect to one or more target objects;

determining a selected subset of the plurality of hypothetical actions with respect to an identified target object from the sequence of the plurality of hypothetical actions; and sending an instruction to the actuator device to cause the actuator device and the picker assembly to perform the selected subset of the plurality of hypothetical actions with respect to the identified target object.

16. The method of claim 15, further comprising:

receiving an input signal from an object recognition device; and determining the set of current information associated with the plurality of target objects based at least in part on the input signal.

17. The method of claim 15, wherein the current state of the sorting system comprises one or more of the following: a current time and a current position of the actuator device.

18. The method of claim 15, wherein the respective first achievable action relative to the initial node comprises an action that the actuator device is able to perform based at least in part on one or more of the following: a current position of the actuator device, the state of the picker mechanism of the plurality of picker mechanisms, and a predicted position of a target object on which the action is to be performed.

19. The method of claim 15, wherein generating the graph of nodes comprises:

determining a respective reward corresponding to at least one first successor node based at least in part on the set of current information associated with the plurality of target objects, wherein the respective reward corresponding to the at least one first successor node is determined based at least in part on a first reward value of target object(s) that have been deposited to reach the at least one first successor node, wherein the first reward value of the target object(s) that have been deposited is determined based at least in part on areas corresponding to the target object(s) that have been deposited; and determining an unvisited first successor node as a current node based at least in part on respective rewards corresponding to the set of first successor nodes.

20. The method of claim 19, wherein the respective reward corresponding to the at least one first successor node is further determined based at least in part on a second reward value corresponding to target object(s) that are pickable by the actuator device from the at least one first successor node, wherein the second reward value of the target object(s) that are pickable is determined based at least in part on second areas corresponding to the target object(s) that are pickable by the actuator device from the at least one first successor node.

21. The method of claim 15, wherein the plurality of picker mechanisms comprises a plurality of suction grippers.

22. A computer program product, wherein the computer program product comprises a non-transitory computer readable storage medium and comprising computer instructions for:

receiving a set of current information associated with a plurality of target objects on a conveyor device;

determining a current state of a sorting system, wherein the sorting system comprises an actuator device that is configured to actuate a picker assembly to capture target objects from the conveyor device, wherein the picker assembly comprises a plurality of picker mechanisms, and wherein the current state of the sorting system comprises a state of a picker mechanism of the plurality of picker mechanisms, wherein the state of the picker mechanism comprises either available for capturing an object or unavailable for capturing the object;

generating a graph of nodes, wherein the graph of nodes comprises a tree structure of successor nodes that expands from an initial node, wherein the successor nodes of the tree structure are time-dependent, wherein the successor nodes comprise a set of first successor nodes that comprises a set of first achievable actions that could be performed with respect to a first set of target objects relative to the initial node, wherein at least one first successor node branches out into a respective set of second successor nodes that comprises a set of second achievable actions that could be performed with respect to a second set of target objects given a performance of a respective first achievable action associated with a respective first successor node, wherein the initial node is determined based on the set of current information associated with the plurality of target objects and the current state of the sorting system, wherein the successor nodes are generated based at least in part on a model of the actuator device, wherein the model of the actuator device comprises approximated lengths of time in which the actuator device is able to perform each of a plurality of actions with respect to objects at a given set of settings associated with the sorting system;

selecting a path within the graph of nodes, wherein the path corresponds to a sequence of a plurality of hypothetical actions to be performed by the actuator device and the picker assembly, over a sequence of points in time, with respect to one or more target objects;

determining a selected subset of the plurality of hypothetical actions with respect to an identified target object from the sequence of the plurality of hypothetical actions; and sending an instruction to the actuator device to cause the actuator device and the picker assembly to perform the selected subset of the plurality of hypothetical actions with respect to the identified target object.

* * * * *